United States Patent [19]

Joseph

[11] Patent Number: 5,344,532

[45] Date of Patent: Sep. 6, 1994

[54] ULTRASONIC ENERGY PRODUCING DEVICE

[76] Inventor: Adrian A. Joseph, 100 N. Harper Ave., Los Angeles, Calif. 90048

[21] Appl. No.: 802,313

[22] Filed: Dec. 4, 1991

Related U.S. Application Data

[63] Continuation-in-part of Ser. No. 490,876, Mar. 9, 1990, Pat. No. 5,109,922.

[51] Int. Cl.$^5$ .................................................. C01B 3/00
[52] U.S. Cl. ........................... 204/157.15; 204/157.42; 204/158.2; 210/748
[58] Field of Search .................. 204/157.15, 157.42, 204/158.2; 210/748

[56] References Cited

U.S. PATENT DOCUMENTS

| | | | |
|---|---|---|---|
| 3,594,314 | 2/1969 | Bilhartz et al. | 210/748 |
| 4,358,373 | 11/1982 | Jubenville | 210/181 |
| 4,582,629 | 4/1986 | Wolf | 210/748 |

*Primary Examiner*—John Niebling
*Assistant Examiner*—C. Delacroix-Muirheid
*Attorney, Agent, or Firm*—Ladas & Parry

[57] ABSTRACT

The present invention pertains to an ultrasonic energy producing device for reducing the viscosity of oil and separating the water from hydrocarbon bonds.

6 Claims, 2 Drawing Sheets

1

ULTRASONIC ENERGY PRODUCING DEVICE

This is a continuation-in-part of U.S. Ser. No. 07/490,876 filed on Mar. 9, 1990, now U.S. Pat. No. 5,109,922.

BACKGROUND OF THE INVENTION

The present invention relates to the extraction of oil from wells and particularly to the use of ultrasonic energy to assist secondary recovery of oil from wells. It also pertains to the expedient passage of oil in pipelines and the separation of water from oil molecules containing water.

During the extraction of oil from a well, a time is reached at which the production from the well decreases to an uneconomically low value. This occurs because the quantity of oil remaining in the well is reduced, the remaining oil has a relatively high viscosity, and the pressure in the well has decreased to a low value.

In order to increase production of the remaining oil, or to perform "secondary recovery", various techniques have been proposed. One of these techniques involves exposure of the remaining oil to ultrasonic energy, which has been found to create a temporary reduction in the viscosity of the oil. In order to employ this technique on a practical level, it has been proposed to dispose an electroacoustic transducer element in the region of an oil producing formation of an oil well and to supply the transducer with alternating current at a suitable frequency. One such arrangement is disclosed in U.S. Pat. No. 3,322,196 which describes arrangements in which an oscillator and amplifier and associated electrical components for producing the electrical signal are disposed with the well in close proximity to the transducer element.

The reason for disposing the electrical components in proximity to the transducer element is to prevent unacceptably high electrical losses between the power generating components and the transducer itself.

In general, it is considered necessary to connect a power supply to an electroacoustic transducer element by a cable having a relatively short length. For example, a known device for reducing the viscosity of liquids in laboratory and industrial applications is specified to be usable with a cable having a length not exceeding 19 feet.

However, the use of such an arrangement in an oil well has been found to present a number of drawbacks. Thus, for example, all of the electrical components are relatively bulky so that difficulties are encountered in mounting these components for introduction into the well. Moreover, because of the high temperatures which exist within a well having any significant depth, various components of the electrical system will fail after a short period of time.

In the instance of dealing with oil in pipelines difficulties have been encountered in transporting the oil because of its thickness. To overcome this, additives or heat has been used or technology along the lines discussed above has been employed. If the viscosity is reduced in view of the above-noted technology the difficulties of locating and mounting the equipment is again encountered.

In the instance of separating oil from water, when the oil molecule is composed of water an elaborate system is used to separate the oil from this water. The oil is exposed to temperatures in the range of 600 to 1,000 degrees fahrenheit as it is fed into a separation tank which generally holds between 1,000 to 1,500 barrels. In some instances a solvent is also mixed into the oil. The water being heavier than the oil thereby separates and falls to the bottom of the tank. The oil is then siphoned off of the top of the tank for further use. The method is time consuming and uneconomical.

SUMMARY OF THE INVENTION

Disclosed herein is an ultrasonic energy producing device comprising:

an electroacoustic ultrasonic energy transducer for converting alternating electrical power signals at a selected voltage into ultrasound energy, said transducer being arranged within the material to be affected and in acoustic communication with said material to be affected;

a source of alternating electrical power at a voltage substantially higher than the selected voltage; and electrical conductor means for a length sufficient to extend from said source of alternating electrical power to said electroacoustic ultrasonic energy transducer, wherein the viscosity of said material to be affected is reduced.

Also disclosed herein is a processfor separating water from a hydrocarbon bond by applying ultrasound in the range of a minimum of 20,000 Hz. at the range of 2,500 to 20,000 watts per hour.

An aspect of the present invention is to provide an ultrasonic energy producing device which avoids the above-noted drawbacks.

Another aspect of the invention is to effectively drive an electroacoustic transducer element located within an oil producing formation in a deep well or an extremely long pipeline by alternating electrical power generated at a ground or local easily accessible level.

Another aspect of the invention is to facilitate the immediate separation of the water from the oil without the need of applying heat to the oil and circulating it through a separation tank.

A further aspect of the invention is to reduce the viscosity of the oil while it passes through pipelines to enhance its flow therein.

A further aspect of the invention is to reduce the viscosity of the oil without the use of heat or additives.

Another aspect of the invention is to eliminate the requirement for disposing of electrical components which are sensitive to high temperatures in proximity to the transducing element.

A final aspect is to reduce the size and complexity of prior art devices to avoid the issue of mounting and locating a plurality of bulky parts.

The above and other desires are achieved according to the present invention by an ultrasonic energy producing device for reducing the viscosity of oil and/or separating water from oil comprising:

an electroacoustic ultrasonic energy transducer for converting an alternating electrical power signal at a selected voltage into ultrasonic energy, the transducer being arranged to be disposed in acoustic communication with oil present in the well or pipeline;

a source of alternating electrical power at a voltage substantially higher than the selected voltage, the source being arranged to be disposed at ground level adjacent the well or locally convenient area; and electrical conductor means of a length sufficient to extend from ground level to at least the level of oil in the well or pipeline for conducting alternating electrical power from the source to the transducer.

Since, according to the present invention, the voltage level of the alternating electrical power produced by the source is substantially higher than that which is to be supplied to the transducer, the losses occurring in even a very long cable will not prevent the delivery of an effective level of power to the transducer. Thus, all electrical components can be disposed at ground level or a locally convenient spot, where they will not be subjected to the high temperatures existing in oil formation regions. Moreover, the difficulties encountered in attempting to lower such electrical components into the well are obviated.

DESCRIPTION OF THE PREFERRED EMBODIMENTS

Figure 1:
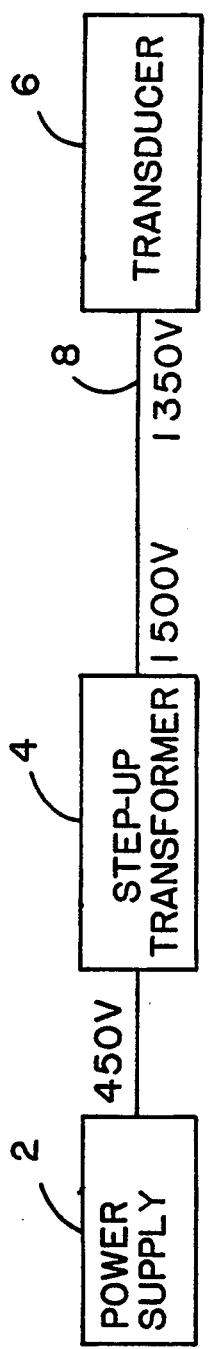
FIGS. 1 and 2 are block diagrams illustrating two preferred embodiments of devices according to the present invention.

FIG. 1 illustrates a first preferred embodiment of the invention composed of a power supply 2 connected by suitable conductors to a step-up transformer 4. Both of these components are located at the ground surface adjacent a well or pipeline. Suspended within the well is an electroacoustic transducer, also known as a horn, 6 which is connected to transformer 4 via a long cable 8 which can have a length of several thousand feet. In the illustrated embodiment, power supply 2 is constructed to produce an output square wave having a peak voltage level of 450 volts. The peak voltage of this square wave power is increased to a level of 1500 volts by transformer 4. It has been found that when the power from transformer 4 is conducted to transducer 6 via a cable 8 having a length of the order of 4000 feet, the voltage drop along the length of cable 8 is of the order of 150 volts. Accordingly, the peak voltage level of the square wave reaching transducer 6 has a magnitude of the order of 1350 volts, which will cause transducer 6 to produce a high level of ultrasonic energy.

Figure 2:
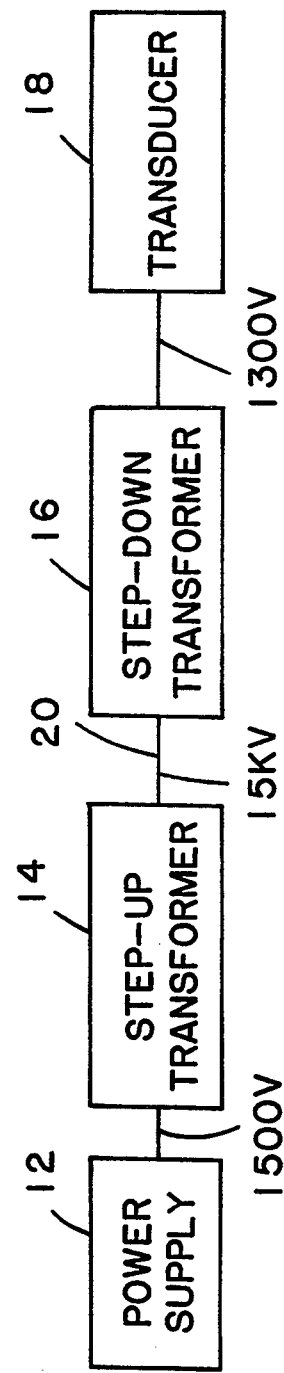

The embodiment shown in FIG. 2 is intended for use in even deeper wells but may as well be used with respect to pipelines. According to this embodiment, power supply 12 produces a square wave output signal at a peak voltage level of 1500 volts and this power is converted, in step-up transformer 14, to a square wave pulse train having a peak voltage of 15 kV. Here again, power supply 12 and transformer 14 are located at ground level, adjacent the well.

Within the well, in the vicinity of an oil producing formation where production is to be stimulated, there are disposed a step-down transformer 16, the latter of which can be identical to transducer 6 of FIG. 1. Transformer 14 is connected to transformer 16 via a long cable 20. Cable 20 can have a relatively great length, as much as of the order of 10,000 feet, without creating significant losses. At the input of transformer 16, the peak voltage of the pulses can be of the order of 13 kV, and this peak voltage is stepped down to a value of the order of 1300 V by transformer 16.

Thus, by significantly raising the voltage at the input end of the long cable 8, 20, it becomes possible to supply high frequency driving energy at a desirable high voltage to a transducer located at the bottom of a well while maintaining all active components which are likely to be deteriorated at high temperatures at ground level.

Preferably, the frequency of the square wave power is of the order of 20 kHz. Transducer 6, 18 may be a commercially available device of the type manufactured by the Branson Company under the designation of model no. 105, the device utilized in an experimental system according to the present invention bearing part no. DJ01034A.

The transformer 4 may be, for example, an induction type transformer manufactured by Phillips having a 5:1 ratio.

The power supply 2, 12 can be a modified version of equipment marketed by the Branson Company. Currently, that company markets a product which they identify as a 2000 W ultrasonic power supply, model 188 P. For use in the embodiment of FIG. 2, the commercially available product would be modified in the following manner. The input DC bus voltage supplied thereto would be increased to 450 VDC; the power transistors, which are mounted on a transistor heat sync assembly, would be replaced by transistors of the type BUX98A; and the resulting square wave power produced by the power supply would then have a peak voltage value of 1500 VDC. By varying the input voltage to such a modified power supply, it can be made to produce the desired square wave output at a peak voltage of 450 V. It will, of course, be appreciated that other combinations of power supply peak output voltage and transformer transformation ratios can be selected within the spirit of the invention.

Thus, devices according to the present invention include power supply units which can be located at ground level and produce a square wave output having a peak voltage substantially higher than that proposed in the prior art so that even if the electroacoustic transducer is connected to the source of operating power via a very long cable, measuring several thousands of feet, the voltage and power levels delivered to the transducer are sufficient to allow for the generation of high energy ultrasonic vibrations which will produce the desired viscosity reducing effect.

It has been found that the commercially available electroacoustic transducer identified above operates quite well when supplied with power in the form of square wave pulses having a peak magnitude of the order of 1300–1350 V.

Either FIGS. 1 or 2 may be modified with the addition of a ceramic crystal connected in series with the transducer to disperse the energy thereof. The crystal acts to change electrical energy into mechanical energy.

Figure 3:
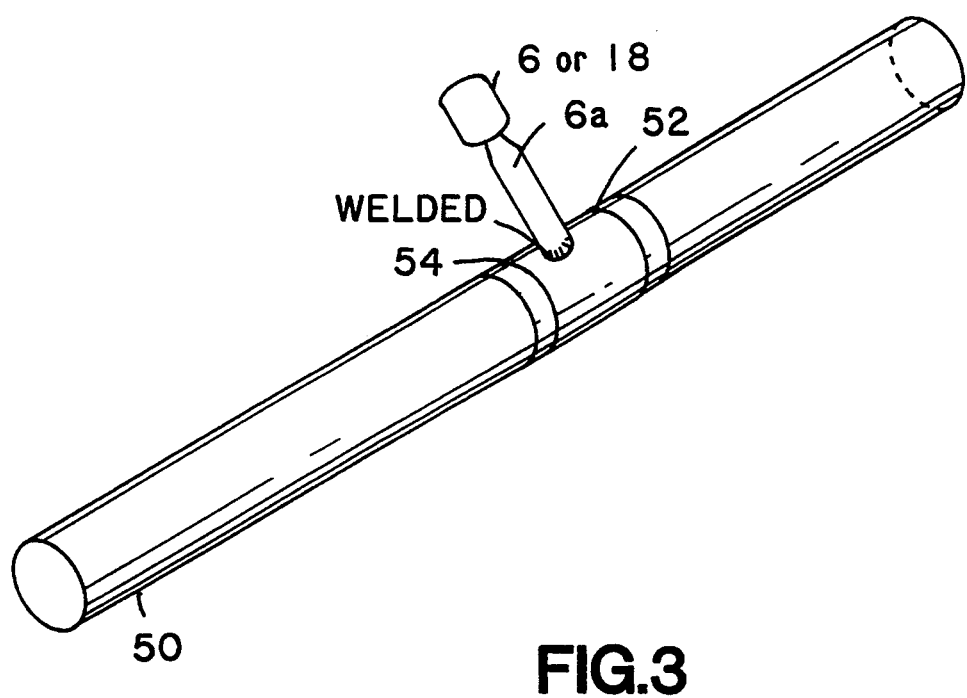
FIG. 3 is a diagram of the device for use with a pipeline.

In FIG. 3, the present invention disclosed in either FIG. 1 or 2 is shown attached to a pipe 50 with the horn 6a of transducer 6, 18 being welded into a pipe segment 52 and in communication therewith. Pipe segment 52 is hollow and communicates with pipe 50. Pipe segment 52 is connected to pipe 50 at opposing ends in a known fashion including the use of rubber or plastic or other insulating washers 54. If the transducer is being used merely to reduce viscosity then FIG. 3 needs no modification. If the transducer is being used to separate the oil and water in an oil/water molecule, then a drainage system would be added at some point in the pipeline to separate out and dispose of the water. Such system is evident to one skilled in the art.

The process of separating the water from an oil/water molecule by ultrasound is to expose the molecule to 20,000 hz of at least 2,500 watts per hour. This will break the bonds of the molecule to enable such separation. In FIG. 3 the cut portion of the pipe 50, that is pipe segment 52, acts as an antennae. Once exposed to the transducer, the viscosity of the oil will be reduced and any water content therein will be separated to float the oil on top. With this reduced viscosity and separation, the oil will flow much faster without the need of additives. The viscosity of the oil is reduced in a matter of seconds such that the application of the ultrasound is not one which in any way requires the oil to be slowed in its flow past the ultrasound device. It is preferable, that a pipeline be provided with the present invention intermittently and preferably at intervals of at least 100 feet or several hours in oil flow time. In this way, there is no chance that the viscosity of the oil will increase during flow.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. The process of separating water out of a molecular hydrocarbon chain by ultrasound applied at 20,000 Hz and a minimum of 2,500 watts per hour.

2. The process of claim 1 wherein said process is continuously applied in a pipe line.

3. The process of claim 2 wherein treatment in said pipe line occurs at intervals of 100 feed in said pipe line.

4. The process of claim 1 wherein said process is continuously applied in a retainer tank.

5. The process of claim 1 wherein said process is continuously applied in retainer tanks with the capacity of 300 to 1500 barrels and to ship tankers on water, in the air, or subground.

6. The process of separating water out of a molecular hydrocarbon chain comprising the single step of:
    applying ultrasound to said hydrocarbon chain to reduce the viscosity of said chain, said ultrasound being applied at 20,000 Hz and a minimum of 2,500 watts per hour, said application acting to break the bonds of the molecule to separate the water therefrom.

* * * * *